(12) United States Patent
Castro

(10) Patent No.: US 9,770,723 B2
(45) Date of Patent: *Sep. 26, 2017

(54) STABILITY CONTROL SYSTEM FOR A HYDROCYCLONE

(71) Applicant: VULCO S.A., Santiago (CL)

(72) Inventor: Eduardo Francisco Olivares Castro, San Juan (AR)

(73) Assignee: Vulco S.A., Santiago (CL)

( * ) Notice: Subject to any disclaimer, the term of this patent is extended or adjusted under 35 U.S.C. 154(b) by 89 days.

This patent is subject to a terminal disclaimer.

(21) Appl. No.: 14/617,890

(22) Filed: Feb. 9, 2015

(65) Prior Publication Data

US 2016/0214120 A1    Jul. 28, 2016

Related U.S. Application Data

(63) Continuation of application No. 13/643,046, filed as application No. PCT/AU2011/000445 on Apr. 19, 2011, now Pat. No. 8,951,418.

(51) Int. Cl.
| | | |
|---|---|---|
| *B04C 5/107* | (2006.01) | |
| *B04C 11/00* | (2006.01) | |
| *B01D 21/26* | (2006.01) | |
| *B01D 21/34* | (2006.01) | |

(52) U.S. Cl.
CPC ............ *B04C 5/107* (2013.01); *B01D 21/267* (2013.01); *B01D 21/34* (2013.01); *B04C 11/00* (2013.01)

(58) Field of Classification Search
CPC ......... B04C 5/107; B04C 11/00; B01D 21/34; B01D 21/267
See application file for complete search history.

(56) References Cited

U.S. PATENT DOCUMENTS

| | | |
|---|---|---|
| 3,358,938 A | 12/1967 | Brown |
| 4,587,024 A | 5/1986 | Hayatdavoudi |
| 4,670,161 A | 6/1987 | Hayatdavoudi |
| 5,132,024 A | 7/1992 | Hulbert |

(Continued)

FOREIGN PATENT DOCUMENTS

| | | |
|---|---|---|
| CL | 0582-1997 | 3/1996 |
| CL | 1980-1999 | 8/1998 |

(Continued)

OTHER PUBLICATIONS

Bond et al., Industrial Monitoring of Hydrocyclone Operation Using Electrical Resistance Tomography, 1st World Congress on Industrial Process Tomography, Buxton, Greater Manchester, pp. 102-107, Apr. 14-17, 1999.

(Continued)

*Primary Examiner* — David A Rifsnyder
(74) *Attorney, Agent, or Firm* — Gardere Wynne Sewell LLP

(57) ABSTRACT

A method of operating hydrocyclone comprising a separation chamber which in use is arranged to generate an internal air core for affecting a material separation process, comprises measuring both a vibrational parameter of the separation chamber and a stability parameter of the internal air core during operation of the hydrocyclone. The measurements are compared against predefined corresponding parameters which are indicative of a stable operation of the hydrocyclone and an operational parameter of the hydrocyclone is adjusted dependent on the comparison.

16 Claims, 4 Drawing Sheets

(56) References Cited

U.S. PATENT DOCUMENTS

| | | |
|---|---|---|
| 5,248,442 A | 9/1993 | Hulbert |
| 6,983,850 B2 | 1/2006 | Olson et al. |
| 7,255,790 B2 | 8/2007 | Rogers et al. |
| 8,951,418 B2 | 2/2015 | Olivares Castro |
| 2003/0173271 A1 | 9/2003 | Watters et al. |
| 2005/0109715 A1 | 5/2005 | Stoy et al. |

FOREIGN PATENT DOCUMENTS

| | | |
|---|---|---|
| CL | 0375-2000 | 2/1999 |
| CL | 1361-2000 | 5/2000 |
| CL | 0577-2002 | 3/2001 |
| CL | 1140-1999 | 1/2003 |
| CL | 1615-2004 | 6/2003 |
| CN | 1494459 A | 5/2004 |
| DE | 19508430 A1 | 9/1996 |
| EP | 0522215 A2 | 1/1993 |
| JP | 2002-066600 A | 3/2002 |
| RU | 2179482 C2 | 2/2002 |
| SU | 912294 A1 | 3/1982 |
| WO | WO-91/00387 A1 | 1/1991 |
| WO | WO-98/37307 A1 | 8/1998 |
| WO | WO-01/03840 A1 | 1/2001 |
| WO | WO-2005/002748 A1 | 1/2005 |
| WO | WO-2011130783 A1 | 10/2011 |

OTHER PUBLICATIONS

Krishna et al., Identification and Prediction of Air Core Diameter in a Hydrocyclone by a Novel Online Sensor Based on Digital Signal Processing Technique, Chemical Engineering and Processing 49, pp. 165-176, Jan. 14, 2010.

Podd, Model-Based Parameterisation of a Hydrocyclone Air Core, Ultrasonics, vol. 38, Issues 1-8, pp. 804-808, Mar. 2000.

The International Preliminary Report on Patentability for PCT/AU2011/00445, Apr. 12, 2012.

International Search Report on Patentability for PCT/AU2011/000445, Mailed Jul. 21, 2011.

Written Opinion for PCT/AU2011/000445, Mailed Jul. 21, 2011.

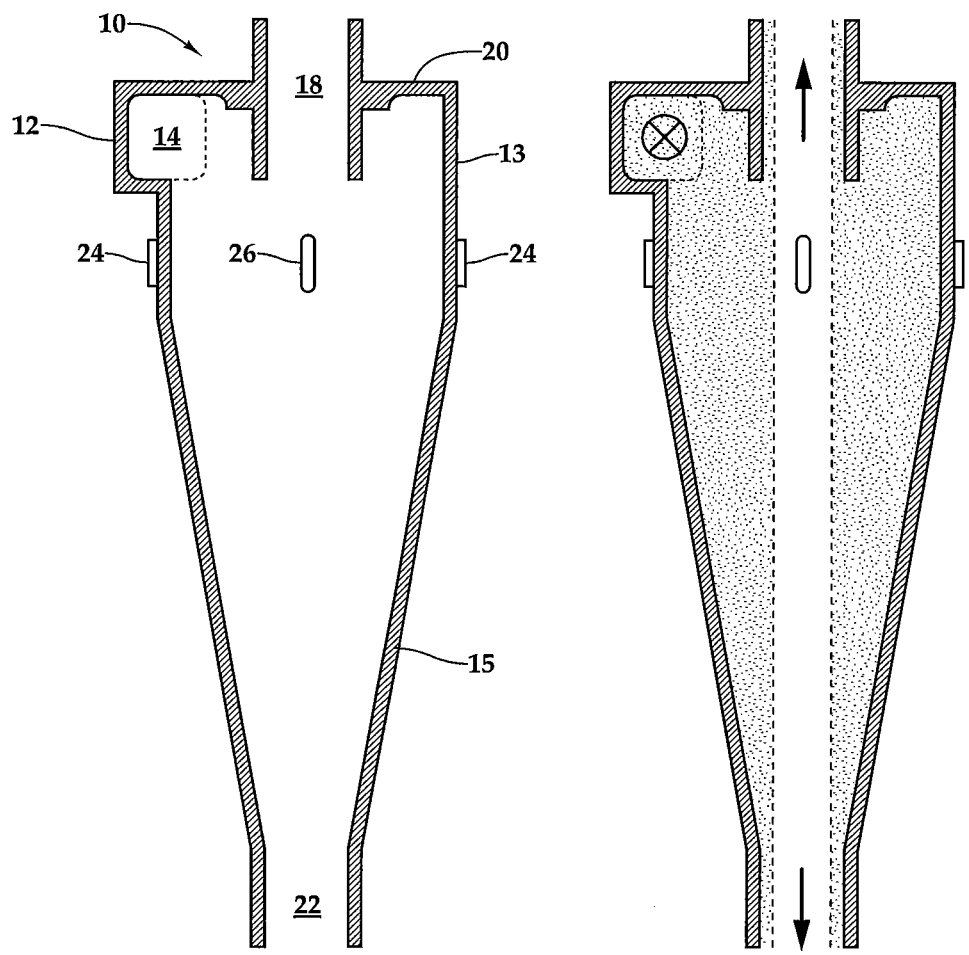
*Fig.1A*  *Fig.1B*

STABILITY CONTROL SYSTEM FOR A HYDROCYCLONE

CROSS-REFERENCE TO RELATED APPLICATIONS

This application is a continuation of U.S Patent No. 8,951,418 which issued on Feb. 10, 2015 from U.S. patent application Ser. No. 13/643,046, with 371(c) filing date of May 15, 2013 and international filing date of Apr. 19, 2011, and entitled STABILITY CONTROL SYSTEM FOR A HYDROCYCLONE, which is a national stage entry of PCT/AU2011/000445, filed Apr. 19, 2011, which claims priority to Australia Application No. 2010903282 filed Jul. 22, 2010 and Chile Application No. 0403-2010 filed Apr. 23, 2010, the disclosures of all of which are hereby incorporated by reference for all purposes.

TECHNICAL FIELD

This disclosure relates to a stability control system for a hydrocyclone and particularly, but not exclusively, for hydrocyclones suitable for use in the mineral and chemical processing industries.

BACKGROUND

Hydrocyclones are commonly used for separating suspended matter carried in a liquid into two discharge streams or "phases" of different density. In the mining industry, for example, hydrocyclones are commonly used to separate particulates which are located in a slurry into a heavier ("coarser") solid phase and a lighter ("finer") solid phase, for classification purposes.

During normal "stable" operation, the slurry enters through an upper inlet of a hydrocyclone separation chamber in the form of an inverted cone, with the heavier solid phase being discharged through a lower outlet and the lighter solid phase being discharged through an upper outlet. However, the stability of a hydrocyclone during such an operation can be readily disrupted, resulting in an ineffective separation process and whereby either an excess of fine particulates exit through the lower outlet or courser particulates exit through the upper outlet.

One form of unstable operation is known as "roping", whereby the rate of solids being discharged through the lower outlet increases to a point where the flow is impaired. If corrective measures are not timely adopted, the accumulation of solids through the outlet will build up in the separation chamber, the internal air core will collapse and the lower outlet will discharge a coarse, rope-shaped flow of coarse solids. Roping may also result in a substantial part of the heavier phase being discharged through the upper outlet. A number of different operational conditions can cause roping, some of which include changes in the composition and viscosity of the slurry, increases in slurry feed speed, among others.

Another form of unstable operation is where the proportion of fine material being incorrectly discharged through the lower outlet progressively increases to an unacceptable level. This form of unstable operation can be caused, for example, as a result of changes in the composition and viscosity of the input slurry, decreases in the slurry feed speed, and so on.

Both of the unstable operating conditions described above can have serious impacts on downstream processes, often requiring additional processing (which, as will be appreciated, can greatly impact on profits) and also result in accelerated machinery wear.

Various techniques have been proposed to determine and correct unstable hydrocyclone operation. Most of these techniques take advantage of a notable characteristic of stable hydrocyclone operation; that is, that the heavier solid phase during stable operation will exhibit a constant umbrella shaped spray pattern as it exits the apex of the lower outlet.

One such technique is described in U.S. Pat. No. 5,132,024 which discloses a sensor mounted on an inner wall of the hydrocyclone apex and being arranged to contact the discharged flow during normal operation. The system outputs a warning when the sensor is unable to detect the flow (i.e. which is indicative of roping). However, it will be appreciated that this technique is only capable of detecting roping after it has already occurred, which may not provide operators with enough time to remedy the situation. Furthermore, the sensor is prone to accelerated wear due to its direct contact with the coarse slurry discharge. Another disadvantage is that the sensor is unable to detect the other mode of unstable operation mentioned above, which involves a bypass of fines through the lower outlet.

Another technique is outlined in U.S. Pat. No. 6,983,850 whereby a vibration sensor is provided on an outer wall of the hydrocylone lower outlet and arranged to detect vibrational changes in the wall that may be indicative of roping. While the vibration sensor disclosed in U.S. Pat. No. 6,983,850 is not subject to wear, and may be able to detect roping earlier than, for example, the sensor of U.S. Pat. No. 5,132,024, it also has a number of drawbacks. For example, the vibration sensor is only arranged to measure significant changes in the lower outlet geometry which occurs after the onset of roping. Furthermore, the vibration sensor readings can be contaminated by noise from surrounding equipment. The vibration sensor is also unable to detect a bypass of fines through the lower outlet.

SUMMARY

In a first aspect, embodiments are disclosed of a method of operating hydrocyclone where the cyclone comprises a separation chamber which in use is arranged to generate an internal air core for effecting a material separation process, the method comprising:
  measuring both a vibrational parameter of the separation chamber and a stability parameter of the internal air core during operation of the hydrocyclone;
  performing a comparison of these measurements with predefined corresponding parameters of the hydrocyclone which are indicative of a stable and/or unstable operation thereof; and
  adjusting an operational parameter of the hydrocyclone dependent on the comparison.

In certain embodiments, the method can further comprise taking the measurement of the stability parameter from within the internal air core. In certain embodiments, the stability parameter of the internal air core can be associated with a geometry of the internal air core, for example a diameter of the internal air core. In certain other embodiments, the stability parameter of the internal air core can be a pressure within the air core.

In certain embodiments, the adjustment step may comprise an adjustment to any one or more of the following operational parameters: pressure of an input material; size of an inlet through which the material passes before entering the separation chamber; size of an upper outlet for discharge of a first phase; and size of a lower outlet for discharge of a second phase.

In certain embodiments, the adjustment step can further comprise making a first adjustment of the operational parameter(s) in response to determining that the vibrational parameter is increasing relative to the predefined parameter and that a diameter of the air core is decreasing.

In certain embodiments, the method can further comprise making a first adjustment of the operational parameter(s) in response to determining that the vibrational parameter is increasing relative to the predefined parameter and that a pressure of the air core is increasing.

In certain embodiments, the method can further comprise making a second adjustment of the operational parameter(s) in response to determining that the vibrational parameter is decreasing relative to the predefined parameter and that a diameter of the air core is increasing.

In certain embodiments, the method can further comprise making a second adjustment of the operational parameter(s) in response to determining that the vibrational parameter is decreasing relative to the predefined parameter and that the pressure of the air core is decreasing.

In certain embodiments, the first adjustment may adjust the operational parameter(s) in an opposite fashion to the second adjustment.

In certain embodiments, the method can further comprise taking the measurements of the vibrational parameter on an outer wall of the separation chamber.

In a second aspect, embodiments are disclosed of a stability control system for a hydrocyclone comprising a separation chamber which in use is arranged to generate an internal air core for affecting a material separation process, the control system comprising:
  a sensor system arranged to measure both a vibrational parameter of the separation chamber, and a stability parameter of the internal air core during operation of the hydrocyclone; and
  a controller arranged to compare the measurements with predefined corresponding parameters of the hydrocyclone which are indicative of at least one of a stable and unstable operation thereof, the controller further arranged to adjust an operational parameter of the hydrocyclone dependent on the comparison.

In certain embodiments, the system can comprise a first sensor arranged to take the measurement of the stability parameter from within the internal air core.

In certain embodiments, the first sensor can be a proximity sensor centrally located within the separation chamber and being arranged to measure a diameter of the internal air core based on a proximity of the solid material circulating around the internal air core.

In certain embodiments, the first sensor can be a pressure sensor centrally mounted within the separation chamber and being arranged to measure a pressure within the internal air core.

In certain embodiments, the sensor system can comprise a vibration sensor arranged to measure the vibrational parameter. In certain embodiments, the vibration sensor may be mounted to a wall of the separation chamber.

In certain embodiments, the controller may be arranged to adjust any one or more of the following operational parameters: pressure of an input material; size of an inlet through which the material passes before entering the separation chamber; size of an upper outlet for discharge of a first phase; and size of a lower outlet for discharge of a second phase.

In certain embodiments, the hydrocyclone can comprise an auxiliary upper outlet chamber having an air duct defined therein, and wherein a further one of the adjustable parameters is a pressure within the air duct and/or geometry thereof.

In certain embodiments, the controller can be arranged to make a first adjustment of the operational parameter(s) in response to determining that the vibrational parameter is increasing relative to the predefined parameter and that a diameter of the air core is decreasing.

In certain embodiments, the controller can be arranged to make a first adjustment of the operational parameter(s) in response to determining that the vibrational parameter is increasing relative to the predefined parameter and that a pressure of the air core is increasing.

In certain embodiments, the controller can be arranged to make a second adjustment to the operational parameter(s) in response to determining that the vibrational parameter is decreasing relative to the predefined parameter and that a diameter of the air core is increasing.

In certain embodiments, the controller can be arranged to make a second adjustment to the operational parameter(s) in response to determining that the vibrational parameter is decreasing relative to the predefined parameter and that the pressure of the air core is decreasing.

In certain embodiments, the first adjustment may adjust the operational parameter(s) in an opposite fashion to the second adjustment.

In a third aspect, embodiments are disclosed of a hydrocyclone implementing a stability control system in accordance with the second aspect.

In a fourth aspect, embodiments are disclosed a method of operating a hydrocyclone where the cyclone comprises a separation chamber which in use is arranged to generated an internal air core for affecting a material separation process, the method comprising:
  measuring a stability parameter of the internal air core during operation of the hydrocyclone;
  comparing the measurements with one or more predefined corresponding stability parameters of the hydrocyclone which are indicative of a stable operation thereof; and
  adjusting an operational parameter of the hydrocyclone in response to determining that the measurements are indicative of a departure from stable operation, based on the comparison.

In a fifth aspect, embodiments are disclosed of a stability control system for a hydrocyclone where the cyclone comprises a separation chamber which in use is arranged to generate an internal air core for affecting a material separation process, the control system comprising:
  a sensor system arranged to measure a stability parameter of the internal air core during operation of the hydrocyclone; and
  a controller arranged to compare the measurements with one or more predefined corresponding stability parameters of the hydrocyclone which are indicative of a stable operation thereof, the controller further arranged to adjust an operational parameter of the hydrocyclone in response to determining that the measurements are indicative of a departure from the stable operation, based on the comparison.

In a sixth aspect, embodiments are disclosed of a stability control system which can comprise a stability sensor of the second or fifth aspects.

In a seventh aspect, embodiments are disclosed of a computer program comprising at least one instruction which, when implemented by a computing system, is arranged to implement the method in accordance with the first or fourth aspects.

In an eighth aspect, embodiments are disclosed of a computer readable medium storing the computer code of the seventh aspect.

Other aspects, features, and advantages will become apparent from the following detailed description when taken in conjunction with the accompanying drawings, which are a part of this disclosure and which illustrate, by way of example, principles of the inventions disclosed.

DESCRIPTION OF THE FIGURES

The accompanying drawings facilitate an understanding of the various embodiments:

FIGS. 1a and 1b are sectional schematic views of a hydrocyclone, including mounting sensors of a stability sensor system, in accordance with a first embodiment;

DETAILED DESCRIPTION

Figures 2A, 2B:
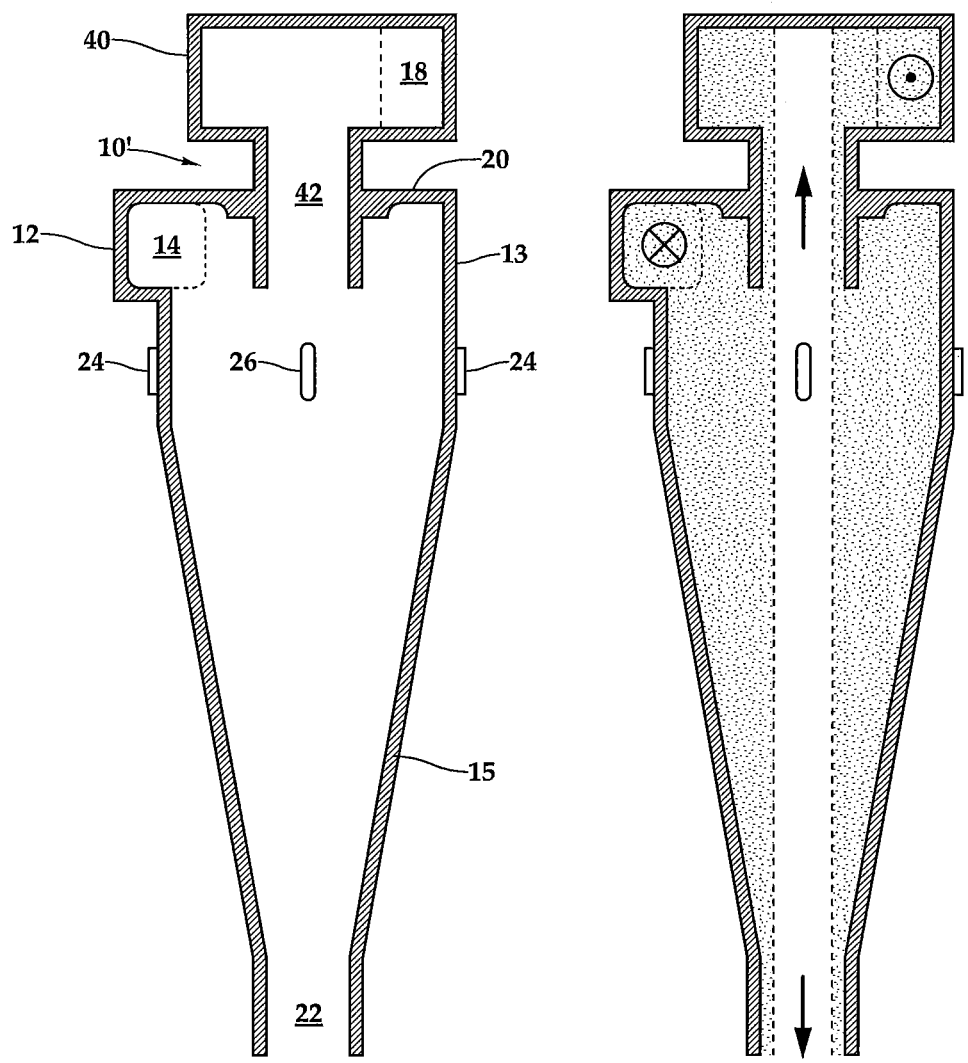
FIGS. 2a and 2b are sectional schematics of a hydrocyclone, including mounting sensors of a stability sensor system, according to a second embodiment.

This disclosure relates to a stability control system for a hydrocyclone of the type that facilitates separation of a liquid or semi-liquid material mixture into two phases of interest. The stability control system is arranged to enable detection of an unstable operation of the hydrocyclone (in relation to the separation process) at an early stage and make appropriate adjustments to return the hydrocyclone to a stable operation.

With reference to FIG. 1a, there is shown a sectional schematic of a hydrocyclone 10 of conventional design comprising a main body 12 having a chamber 13 defined therein. The chamber 13 comprises an inlet section 14 and a conical separating section 15. The hydrocyclone further includes a feed inlet (not shown) for feeding a particle bearing mixture in the form of a particulate slurry, into the inlet section 14 of the chamber 13. An overflow outlet (hereafter "upper outlet") 18 is centrally located in an upper wall 20 of the chamber 13 for discharge of a first one of the phases. An underflow outlet (hereafter "lower outlet") 22 is centrally located at the other end of the chamber 13, for discharge of a second one of the phases. The hydrocyclone 10 is arranged to generate an internal air core around which the slurry circulates. During stable operation, the hydrocyclone 10 operates such that a lighter solid phase of the slurry is discharged through the upper outlet 18 and a heavier solid phase is discharged through the lower outlet 22. This is best shown in FIG. 1b, where the internally generated air core is represented by the dotted lines which run the length of the body 12.

The hydrocyclone 10 implements a stability control system comprising one or more vibration sensors (or transducers) arranged to measure a vibrational parameter of the main body 12. In the context of the specification, it will be understood that the term vibrational is to be construed broadly and include within its scope any oscillatory displacement or movement and as such can correspond (depending on the magnitude) to variations in displacement as a function of time and/or speed and/or acceleration. In the illustrated embodiment, the stability control system comprises a plurality of low frequency vibration sensors 12, which are mounted on an external wall of the chamber 13 of the main body 12, and arranged to measure changes in the operational resonant frequency of the hydrocyclone 10 (i.e. generated through the slurry contacting the internal walls as it circulates around the air core). It will be understood that the vibration sensors 12 may advantageously detect small variations in the separation process hydrodynamics that may be indicative of a departure from a stable operating condition.

The stability control system further comprises at least one sensor 26 arranged to measure a stability parameter of the air core generated within the body 12. The sensor 26 is centrally located within the body 12 such that it is in fluid communication with the air core. For example, the sensor 26 may be mounted on a support structure which couples to a collar portion of the upper inlet 18. In one embodiment, the sensor 26 may be in the form of a pressure sensor arranged to measure a pressure within the air core. In an alternative embodiment, the sensor 26 may be arranged to measure the air core geometry. For example, the sensor 26 may be in the form of a proximity sensor arranged to measure the proximity of the slurry circulating around the air core (thus enabling the diameter of the air core to be determined). In yet another embodiment, both a proximity sensor and pressure sensor may be employed. The pressure and/or geometry measurements advantageously provide an indication of fine variations occurring within the air core that may not be detectable by the vibration sensor and which provide another early indication of instability.

Figure 4:
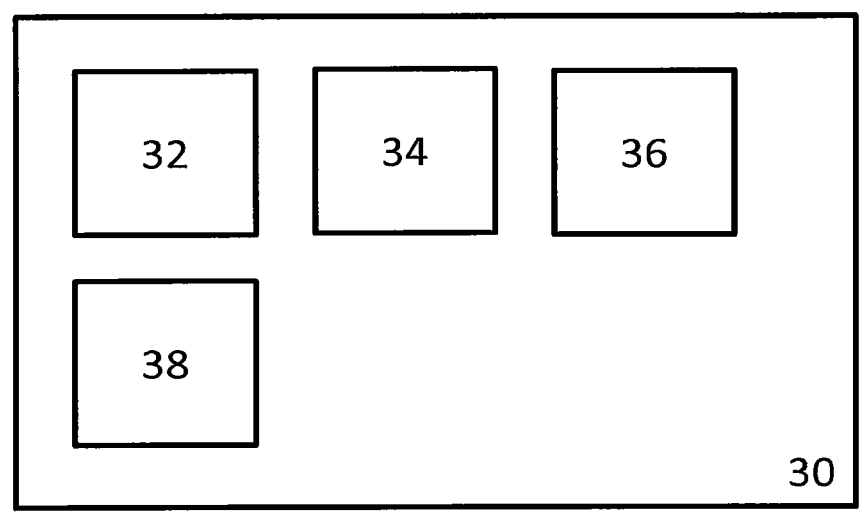
FIG. 4 is a schematic of a controller of a stability sensor system in accordance with an embodiment.

With reference to FIG. 4, the stability control system further comprises a controller in the form of a microprocessor 30. As shown in FIG. 4, the microprocessor 30 implements a number of modules including a communication module 32 arranged to communicate with the sensors 24, 26 for receiving the measurements of the various parameters continuously taken during operation of the hydrocyclone 10. A comparison module 34 compares the measurements against corresponding predefined parameters which are indicative of a stable or optimum operation of the hydrocyclone 10. The predefined parameters are stored in memory 36. A control module 38 is arranged to perform various control actions dependent on the output of the comparison module 34 for maintaining or restoring stabilisation of the hydrocyclone separation process. In an embodiment, the control module 38 is arranged to control one or more actuators, or the like arranged to control a pressure of the input slurry, size of the feed inlet, size of the upper overflow outlet 18 and size of the lower underflow outlet 22. For example, where the pressure of the input slurry is to be adjusted, the control module 38 may control a pump having a variable rotor speed and/or a device arranged to reduce or increase the cross section of the feed inlet. It will be understood that the controller 30 may be arranged to control any desired operational parameters for adjusting the hydrodynamics of the system for maintaining or restoring a stable separation process.

An alternative hydrocyclone sensor arrangement is shown in FIG. 2a. According to this embodiment, the hydrocyclone 10' comprises an auxiliary upper chamber 40 positioned adjacent the upper wall 20 of the cyclone body 12. The auxiliary upper chamber 40 is vertically aligned with the separation chamber 13 and communicates with the separation chamber 13 via an auxiliary outlet 42. An upper overflow outlet 44 is provided in a region of the auxiliary chamber 40 which is located radially away of the auxiliary outlet 42. According to this alternative arrangement, the sensor 26 is attached to supports that are fixed to an upper portion of the auxiliary chamber 40 (i.e. that intersects the central axis of the hydrocyclone 10'). FIG. 2b illustrates the movement of the slurry as it passes through the hydrocyclone 10' of FIG. 2a. It is worth noting that the upper overflow outlet 44 is tangentially aligned with the auxiliary chamber 40, a feature that facilitates air core stability. In addition to providing a more stabilized air core, according to the second embodiment the slurry has no, or less rigorous, contact with the upper portion of the auxiliary chamber 40 to which the sensor 26 is secured, thus increasing the operational life of the sensor 26.

Figures 3A, 3B:
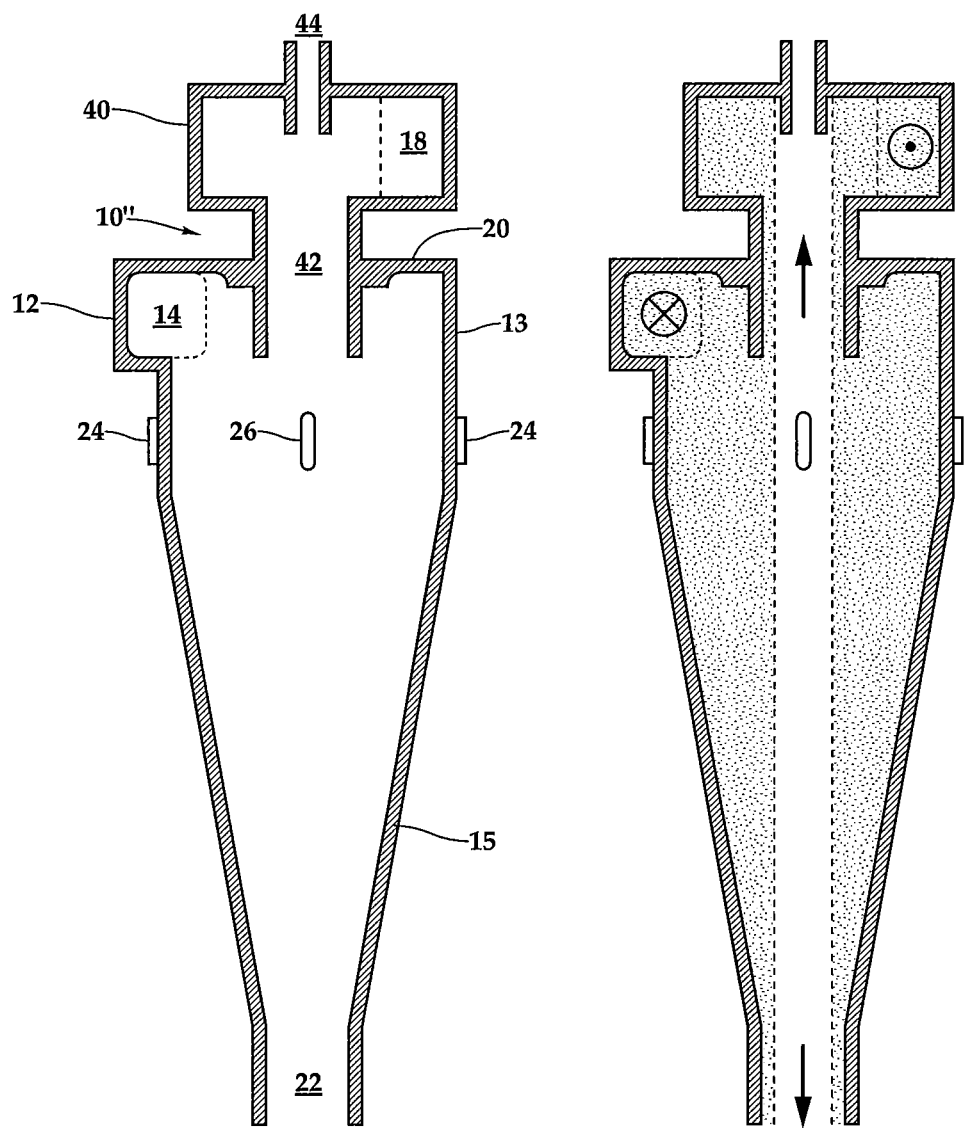
FIGS. 3a and 3b are sectional schematics of a hydrocyclone, including mounting sensors of a stability sensor system, according to a third embodiment.

FIG. 3a shows yet a further embodiment of a hydrocyclone sensor arrangement. According to this embodiment, the hydrocyclone 10" auxiliary chamber 40 comprises an air duct 44 which is aligned and in fluid contact with the air core generated in the separation chamber 13. The sensor 26 may be in the form of a pressure sensor fluidly connected with the duct 44, and the control module 38 is arranged to adjust the air pressure inside the air duct 44, thereby indirectly adjusting the pressure inside said air core (i.e. for maintaining or restoring stability). FIG. 3b illustrates movement of the slurry as it passes through the hydrocyclone 10".

A methodology for operating the stability control system comprises measuring both a vibrational parameter of the separation chamber and a stability parameter of the internal air core during operation of the hydrocyclone, using sensors/transducers 24, 26 as previously described. The measurements are then communicated to the controller 30 which compares the measurements against predefined corresponding parameters which are indicative of a stable operation of the hydrocyclone. The controller 30 may then adjust one or more operational parameters of the hydrocyclone if, based on the comparison, it is determined that the measurements are indicative of a departure from stable operation of the hydrocyclone.

For example, a first adjustment of the operational parameter(s) may be made in response to determining that the vibrational parameter is increasing relative to the predefined parameter and that a diameter of the air core is decreasing. Such a comparison may be indicative of roping and thus the first adjustment may, for example, be to decrease the input slurry speed or pressure (or to adjust another operational parameter known to remedy a roping instability condition). Alternatively, where the sensor 26 is arranged to measure pressure, the first adjustment may be made in response to determining both an increase in vibration and air core pressure.

Where the comparison is indicative of instability through an excess of fines being bypassed through the lower outlet 22 (i.e. relative decrease in vibration and either increase in geometry or decrease in pressure), a second adjustment may be made by the controller 30. The second adjustment may be the opposite of the first adjustment (e.g. to increase feed speed, pressure, or adjust other operational parameters known to remedy a fines bypass instability condition).

It will appreciated that the above embodiments may operate to detect instability of a hydrocyclone separation process at a very early stage by simultaneously monitoring hydrodynamic conditions (i.e. by way of the vibrational sensor(s)), as well as characteristics of the air core. In other words, embodiments are based on the realisation that optimum operating conditions do not exclusively depend on the hydrodynamics of the slurry or on the geometry of the air core, but on a combination of the two. In effect, for certain hydrodynamic conditions there is a range in which the properties of the air core can vary, without departing from an optimum operation. However, for different hydrodynamic conditions, the range in which the properties of the air core can vary without departing from an optimum operation is not the same. Expressed another way, the vibration sensors allow detection of minor variations in the separation process hydrodynamics (associated to eventual departures from the optimum operation point) that are not necessarily observed in the air core, while the pressure and/or air core geometry sensors permit detection of small variations in the separation process (associated to eventual departures from the optimum operation point) which are not necessarily observed in the vibrations.

Another advantage of at least one embodiment described is that the stability control system is able to promptly detect the presence of foreign objects in the hydrocyclone, such as mill balls or rods (i.e. from an upstream grinding process) which can affect the internal geometry of the hydrocyclone and, as a result, seriously impair the separation capacity of the hydrocyclone and/or its integrity.

In an alternative embodiment, the controller may be arranged to store both predefined measurements indicative of a stable operation and an un-stable operation and the measurements taken from the sensors compared against both predefined measurements to identify an onset of roping or a by-pass of fines. Alternatively, the controller may only store predefined measurements indicative of an unstable operation, with the determination based on those results only (i.e. no adjustments made until the measurements correspond with the predefined unstable measurements).

In yet a further alternative, the stability control system may implement only the stability parameter sensor for the air core (i.e. pressure or proximity), with the measurements compared against a corresponding stability parameters indicative of stable or unstable operation for determining a departure from a stable operating condition.

In the foregoing description of certain embodiments, specific terminology has been resorted to for the sake of clarity. However, the disclosure is not intended to be limited to the specific terms so selected, and it is to be understood that each specific term includes other technical equivalents which operate in a similar manner to accomplish a similar technical purpose. Terms such as "upper" and "lower", "above" and "below" and the like are used as words of convenience to provide reference points and are not to be construed as limiting terms.

In this specification, the word "comprising" is to be understood in its "open" sense, that is, in the sense of "including", and thus not limited to its "closed" sense, that is the sense of "consisting only of". A corresponding meaning is to be attributed to the corresponding words "comprise", "comprised" and "comprises" where they appear.

The preceding description is provided in relation to several embodiments which may share common characteristics and features. It is to be understood that one or more features of any one embodiment may be combinable with one or more features of the other embodiments. In addition, any single feature or combination of features in any of the embodiments may constitute additional embodiments.

In addition, the foregoing describes only some embodiments of the inventions, and alterations, modifications, additions and/or changes can be made thereto without departing from the scope and spirit of the disclosed embodiments, the embodiments being illustrative and not restrictive.

Furthermore, the inventions have described in connection with what are presently considered to be the most practical and preferred embodiments, it is to be understood that the invention is not to be limited to the disclosed embodiments, but on the contrary, is intended to cover various modifications and equivalent arrangements included within the spirit and scope of the inventions. Also, the various embodiments described above may be implemented in conjunction with other embodiments, e.g., aspects of one embodiment may be combined with aspects of another embodiment to realize yet other embodiments. Further, each independent feature or component of any given assembly may constitute an additional embodiment.

What is claimed is:

1. A method of operating a hydrocyclone where the hydrocyclone includes a separation chamber that is arranged to generate an internal air core in operation to cause at least a partial material separation, the method comprising:
    measuring both a vibrational parameter of the separation chamber and a stability parameter of the internal air core during operation of the hydrocyclone;
    performing one or more comparisons of one or both of the measurements with one or more of a corresponding parameter of the hydrocyclone that is indicative of a stability of the operation of the hydrocyclone; and
    adjusting one or more operational parameters of the hydrocyclone based on the one or more of the comparisons.

2. The method of operating a hydrocyclone in accordance with claim 1, wherein the stability parameter of the internal air core is associated with one from the group that includes a geometry of the internal air core, a diameter of the internal air core, and a pressure of the air core.

3. The method of operating a hydrocyclone in accordance with claim 1, wherein the adjusting one or more operational parameters includes adjusting a pressure of an input material.

4. The method of operating a hydrocyclone in accordance with claim 1, wherein the adjusting one or more operational parameters includes adjusting a size of an inlet through which the material passes before entering the separation chamber.

5. The method of operating a hydrocyclone in accordance with claim 1, wherein the adjusting one or more operational parameters includes adjusting a size of an upper outlet for discharge of a first phase of the material.

6. The method of operating a hydrocyclone in accordance with claim 1, wherein the adjusting one or more operational parameters includes adjusting a size of a lower outlet for discharge of a second phase of the material.

7. The method of operating a hydrocyclone in accordance with claim 1, further comprising making a first adjustment to two or more operational parameters in response to determining that the vibrational parameter is not satisfactory based at least partially on performing the one or more comparisons.

8. The method of operating a hydrocyclone in accordance with claim 1, further comprising making a first adjustment to two or more operational parameters in response to determining that the stability parameter is not satisfactory based at least partially on performing the one or more comparisons.

9. A hydrocyclone with a stability control system, the hydrocyclone includes a separation chamber that is arranged to generate an internal air core in operation to cause at least a partial material separation process, the stability control system comprising:
    a first sensor arranged to measure a vibrational parameter of the separation chamber during operation of the hydrocyclone;
    a second sensor arranged to measure a stability parameter of the internal air core during operation of the hydrocyclone; and
    one or more controllers arranged to compare the measurements of the first and second sensors with at least one corresponding parameter of the hydrocyclone that is indicative of a stability of the operation of the hydrocyclone, the one or more controllers further arranged to adjust an operational parameter of the hydrocyclone based on one or more of the comparisons.

10. The hydrocyclone in accordance with claim 9, wherein the first sensor of the stability control system comprises a vibration sensor arranged to measure the vibrational parameter.

11. The hydrocyclone in accordance with claim 9, wherein the second sensor of the stability control system is arranged to take the measurement of the stability parameter from within the internal air core.

12. The hydrocyclone in accordance with claim 9, wherein the one or more controllers is arranged to adjust an operational parameter of the hydrocyclone based on one or more of the comparisons, and the operational parameter includes a pressure of an input material provided to the hydrocyclone.

13. The hydrocyclone in accordance with claim 9, wherein the one or more controllers is arranged to adjust an operational parameter of the hydrocyclone based on one or more of the comparisons, and the operational parameter includes a size of an inlet to the hydrocyclone through which material passes before entering the separation chamber.

14. The hydrocyclone in accordance with claim 9, wherein the one or more controllers is arranged to adjust an operational parameter of the hydrocyclone based on one or more of the comparisons, and the operational parameter includes a size of an upper outlet for discharge of a first phase of the material from the hydrocyclone.

15. The hydrocyclone in accordance with claim 9, wherein the one or more controllers is arranged to adjust an operational parameter of the hydrocyclone based on one or more of the comparisons, and the operational parameter includes a size of a lower outlet for discharge of a second phase of the material from the hydrocyclone.

16. A stability control system for a hydrocyclone that includes a separation chamber that is arranged to generate an internal air core in operation to cause at least a partial material separation, the stability control system comprising:
    a sensor system arranged to measure a stability parameter of the internal air core during operation of the hydrocyclone, the stability parameter measurement being taken using a stability measurement sensor positioned at least partially inside the separation chamber and in fluid communication with the internal air core; and
    one or more controllers arranged to compare the measured stability parameter with one or more provided stability parameters of the hydrocyclone that are indicative of a stable operation of the hydrocyclone, the controller further arranged to adjust an operational parameter of the hydrocyclone in response to determining that the measured stability parameter is indicative of a departure from the stable operation.

* * * * *